(12) United States Patent
Wang et al.

(10) Patent No.: US 7,707,334 B2
(45) Date of Patent: Apr. 27, 2010

(54) SELF-SYNCHRONIZING HARDWARE/SOFTWARE INTERFACE FOR MULTIMEDIA SOC DESIGN

(75) Inventors: Lincheng Wang, San Jose, CA (US); Ching-Han Tsai, San Jose, CA (US); Cheng-Lun Chang, San Jose, CA (US); Uma Shankar Durvasula, San Jose, CA (US); Jau-Wen Ren, Saratoga, CA (US)

(73) Assignee: Mobilic Technology (Cayman) Corp., Grand Cayman (KY)

( * ) Notice: Subject to any disclaimer, the term of this patent is extended or adjusted under 35 U.S.C. 154(b) by 213 days.

(21) Appl. No.: 11/282,531

(22) Filed: Nov. 18, 2005

(65) Prior Publication Data

US 2007/0130394 A1 Jun. 7, 2007

(51) Int. Cl.
*G06F 3/00* (2006.01)
*G06F 5/00* (2006.01)
(52) U.S. Cl. .......................... 710/52; 710/19
(58) Field of Classification Search ..................... 710/19
See application file for complete search history.

(56) References Cited

U.S. PATENT DOCUMENTS

| | | | |
|---|---|---|---|
| 5,488,695 A | * | 1/1996 | Cutter ........................ 710/110 |
| 5,990,958 A | * | 11/1999 | Bheda et al. ............. 348/407.1 |
| 6,081,854 A | * | 6/2000 | Priem et al. .................... 710/37 |
| 6,775,734 B2 | | 8/2004 | Chang ............................ 711/2 |
| 6,832,310 B1 | * | 12/2004 | Bailey et al. .................... 713/1 |
| 6,867,781 B1 | | 3/2005 | Van Hook et al. ........... 345/506 |
| 2004/0019882 A1 | * | 1/2004 | Haydt ......................... 717/151 |
| 2006/0041895 A1 | * | 2/2006 | Berreth ....................... 719/328 |

* cited by examiner

*Primary Examiner*—Henry W. H. Tsai
*Assistant Examiner*—Kris Rhu
(74) *Attorney, Agent, or Firm*—Beyer Law Group LLP

(57) ABSTRACT

A forced lock-step operation between a CPU (software) and the hardware is eliminated by unburdening the CPU from monitoring the hardware until it is finished with its task. This is done by providing a data/control message queue into which the CPU writes combined data/control messages and places an End tag into the queue when finished. The hardware checks the content of the message queue and starts decoding the incoming data. The hardware processes the data read from the message queue and the processed data is then written back into the message queue for use by the software. The hardware raises an interrupt signal to the CPU when reaching the End tag. Speed differences between hardware and software can be compensated for by changing the depth of the queue.

13 Claims, 3 Drawing Sheets

MPEG Encoding

FIG. 1 - Prior Art

SELF-SYNCHRONIZING HARDWARE/SOFTWARE INTERFACE FOR MULTIMEDIA SOC DESIGN

BACKGROUND OF THE INVENTION

1. Field of the Invention

The invention relates to a method of synchronizing the exchange of data between hardware and software via a buffer containing both data and control information, and more particularly where the CPU is not required to synchronize the data exchange between hardware and software thereby saving clock cycles.

2. Description of the Related Art

Typically, the hardware (HW) in a System-On-Chip (SOC) design operates in the following fashion, as shown in FIG. 1, a flowchart of the prior art.

1. Block 10: the hardware stays in the idle state, waiting for instructions from the software (SW, i.e. CPU).
2. Block 11: the CPU programs the registers in the hardware module to set up various control information.
3. Block 12: after register programming is finished, the CPU enables the hardware (Block 13).
4. Block 14: the hardware starts performing the desired operations as specified by the control parameters.
5. Block 15: after the operations are finished, the hardware raises an interrupt to notify the CPU (Block 16) and goes back to the idle state (Block 10), waiting for the HW interrupt.

And repeating the sequence:

6. Block 11: upon receiving the HW interrupt, the CPU moves on to schedule the next HW task, starting with new register programming.

The above scheme often results in frequent and inefficient HW/SW communications. For example, in order to perform a long series of operations, each of which may require a different set of control parameters, the CPU needs to baby-sit the HW, feeding a new set of register values upon completion of the previous operation. The CPU in SOC designs often functions in the multi-tasking mode, such as babysitting multiple hardware modules and/or performing its own computations. As a result, it may not be able to respond to the HW interrupt in time. Precious HW clock cycles are thus wasted on waiting for further instructions from the CPU.

For encoding, the CPU programs the registers inside the MPEG encoder to specify the encoding parameters. The MPEG encoder starts encoding and stores encoded video data into either DRAM or an internal buffer (not shown). The MPEG encoder further sends interrupts periodically to the CPU, so that the CPU can read encoded data from the MPEG encoder.

For decoding, the CPU programs the registers inside the MPEG decoder to specify the decoding parameters. The CPU starts decoding and stores decoded video data into either DRAM or the above mentioned buffer inside the MPEG decoder. The CPU then programs the MPEG decoder to start decoding.

The HW/SW synchronization becomes an even more important issue when HW and SW collaborate to work on the same set of data in order to finish one common task. For example, for MPEG (Moving Pictures Expert Group) decoding, the SW may be responsible for bit stream parsing and variable-length decoding, while the HW performs the dequantization (DQ), inverse discrete cosine transformation (IDCT), and motion compensation (MC). Both the data (i.e. IDCT coefficients) and the associated control information (e.g. motion vectors and quantization parameters) are frequently passed between SW and HW. Depending on the SOC architecture, the HW and the SW may not be operating at the same speed, but without an efficient HW and SW interface for exchanging both the data and the control information, the HW and the CPU are forced to operate in a lock-step way.

Prior art U.S. patents which somewhat address synchronization are:

U.S. Pat. No. 6,775,734 (Chang) discloses a method and system for providing a memory access method using a system management interrupt. When the CPU receives a system management interrupt signal, the signal starts operating in the system management mode and the CPU executes a system management interrupt handler routine. The computer system comprises a CPU, a chipset and a memory unit.

U.S. Pat. No. 6,867,781 (Van Hook et al.) provides for the synchronizing of a graphics pipeline with an external actor such as, e.g., a graphics command producer. A token including a variable data message is inserted into a graphics command sent to a graphics pipeline. At a predetermined point in the pipeline, the token is captured and a signal is generated indicating a token has arrived.

In the method of the prior art, synchronization between encoding and decoding parameters (or control information) and video data is time consuming and inefficient. Therefore precious computation resources are not put to optimal use. What is required is self-synchronization of software and hardware, where data and associated control information are passed between them. Accordingly, a new approach is offered for efficient data/control information transfer.

SUMMARY OF THE INVENTION

It is an object of at least one embodiment of the present invention to provide a method of synchronizing the exchange of data between hardware and software, whereby the CPU is not required to synchronize the data exchange between hardware and software thereby solving the hardware/software problem and saving clock cycles.

It is another object of the present invention to provide compensation for the speed difference between the hardware and the software.

It is yet another object of the present invention to have messages flow in both directions between hardware and software.

It is still another object of the present invention to uncouple the CPU from the task of monitoring the hardware and software interface until the CPU has time to process the message queue.

It is a further object of the present invention is to provide this method in an SOC design.

These and many other objects have been achieved by describing methods which use a combined data/control message queue (Xfer buffer) where the hardware is in idle mode until the software (CPU) enables the hardware, where the CPU writes data/control messages into the message queue, where the CPU places an End Of Message tag into the queue when finished, where the hardware checks the content of the message queue and then starts decoding the incoming data (using associated control parameters, if the particular application requires it), where the hardware processes the data read from the message queue, where the processed data is then written back into the message queue, and where the hardware raises an interrupt signal to the CPU when reaching the End of Message tag. Compensation for the speed difference between the hardware and the software is achieved by adjusting the depth of the queue. A plurality of message words may be used, where each message word may combine data and control information, and where unique tags identify the type of message word.

These and many other objects and advantages of the present invention will be readily apparent to one skilled in the art to which the invention pertains from a perusal of the claims, the appended drawing, and the following detailed description of the preferred embodiments.

DESCRIPTION OF THE PREFERRED EMBODIMENT

The present invention provides a very successful solution of the problem outlined above by using a combined data/control message queue between the hardware (HW) and the software (SW) as a solution to the HW/SW synchronization problem. We call this combined data/control message queue the XBUF (Xfer buffer). Our application is MPEG encoding and decoding, but the invention itself is general in nature and can easily be extended to other SOC applications such as communications, data storage, etc. Whenever data processing is shared by HW and SW, the present inventive technique can apply. The queue depth of the XBUF can be either fixed or variable, depending on the application requirement. The larger the potential speed difference between the HW and the SW is, the deeper the queue needs to be. The message words in the XBUF are tagged to indicate whether a particular word contains data or control information (essentially MPEG control information). Different tags correspond to different formats of message words.

Figure 2:
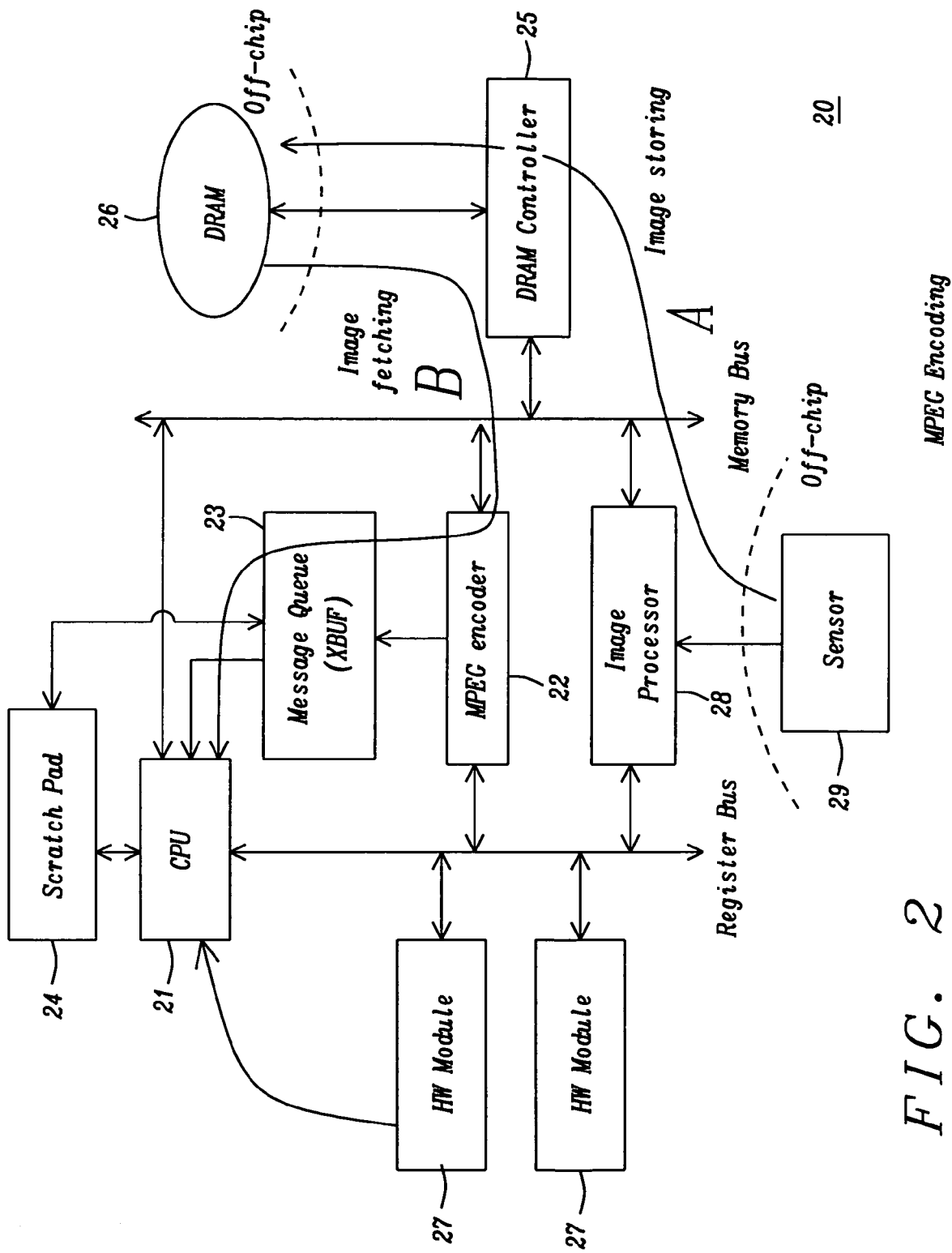
FIG. 2 is a block diagram of MPEG encoding the of the present invention.

Referring now to FIG. 2, we describe the system block diagram for MPEG Encoding 20 of the preferred embodiment of the present invention. CPU 21 interfaces via a Register Bus and a Memory Bus with MPEG encoder 22. The MPEG encoder signals the Message Queue (XBUF) 23, which in turn interfaces with the CPU. The XBUF, forming the queue, may be implemented as either a buffer (not shown) within the MPEG encoder/decoder combination or as Scratch Pad 24 connected to both the CPU and the Message Queue. The MPEG decoder is discussed in FIG. 3 below. The MPEG encoder is shown to interface via the Memory Bus and a DRAM Controller 25 with an off-chip DRAM 26. Typically one or more HW Modules 27 may be coupled to the Register Bus. These HW Modules signal the CPU via Interrupt lines (only one Interrupt line is shown). An Image Processor 28 is further shown coupled to both the Register Bus, the Memory Bus, and to an off-chip Sensor 29. The system block diagram of FIG. 2 (as well as that of FIG. 3, discussed below) describes a typical system architecture which could be implemented in a variety of ways without deviating from the spirit of the present invention. Image storing comprises, as indicated by Arrow A, Image data flowing from the Sensor via the Image Processor and the DRAM Controller to the DRAM. Image fetching comprises, as indicated by Arrow B, data from the DRAM passing through the MPEG encoder, the Message Queue, and back to the CPU.

Figure 3:
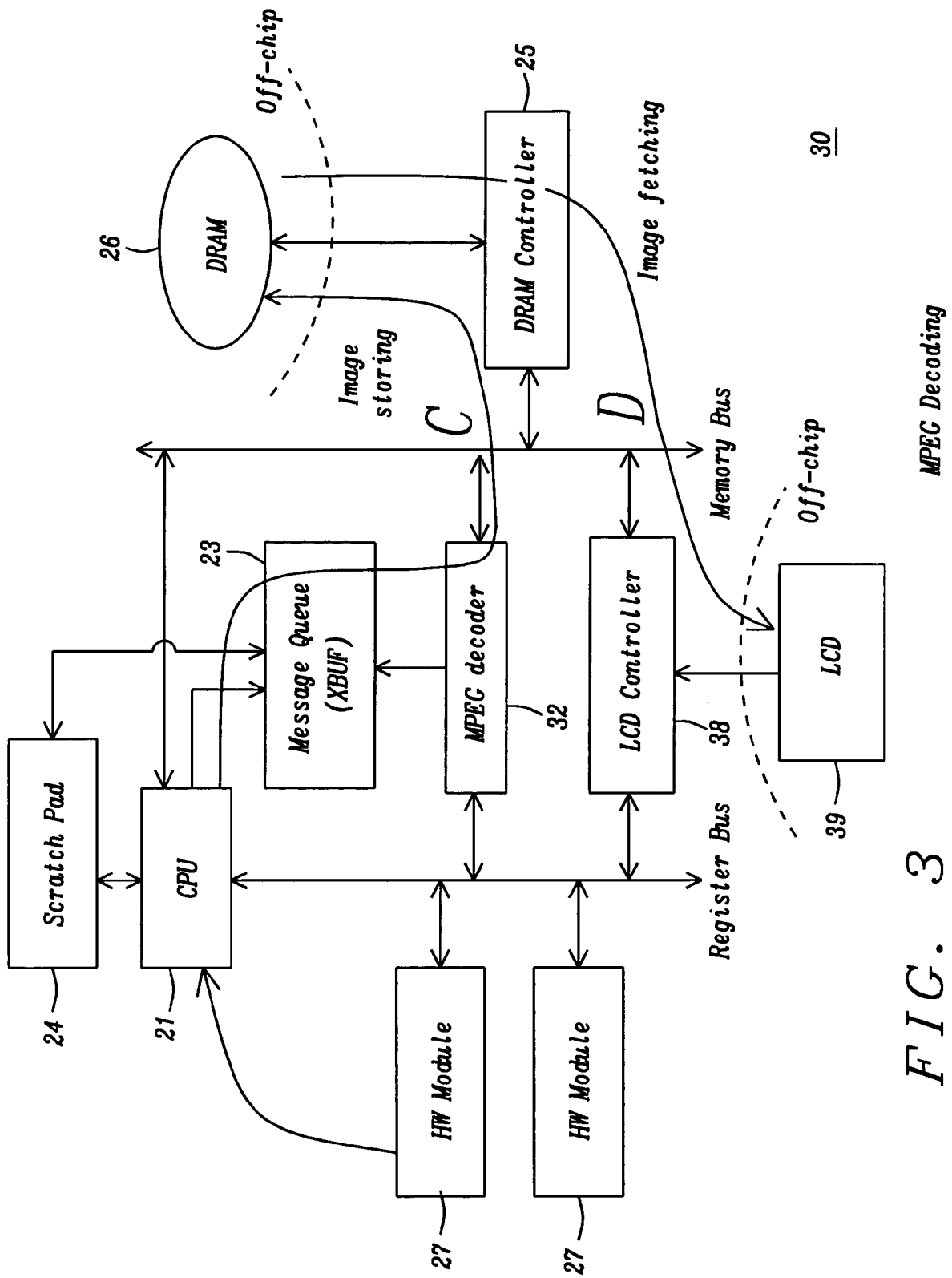
FIG. 3 is a block diagram of MPEG decoding the of the present invention.

We now refer to FIG. 3, where we describe the system block diagram for MPEG Decoding 30 of the preferred embodiment of the present invention. FIG. 3 is like FIG. 2 in its structure, except that MPEG decoder 32 replaces MPEG encoder 22, LCD Controller 38 replaces Image Processor 28, Arrow C replaces Arrow B, Arrow D replaces Arrow A, and the off-chip liquid crystal display (LCD) 39 replaces Sensor 29. MPEG encoder 22 and MPEG decoder 32 form a unit commonly referred to as MPEG codec. They are shown separately in FIG. 2 and FIG. 3 for the sake of clarity of the illustrations. Image storing comprises, as indicated by Arrow C, data flowing from the CPU via the Message Queue to the MPEG encoder and the DRAM Controller to the DRAM. Image fetching comprises, as indicated by Arrow D, image data from the DRAM flowing via the DRAM Controller and the LCD Controller to the off-chip LCD.

In the present invention, a unified control/data Message Queue (XBUF) is used for both control parameters and video data transfer between CPU and HW. Control and video data are interleaved inside the message queue in the correct order so that the queue can be accessed sequentially with no time-consuming synchronization between control parameters and video data. The XBUF can be implemented using a buffer inside the MPEG encoder/decoder 22/32, or using the Scratch Pad which is accessible by both the MPEG encoder/decoder and the CPU. Implementation is very flexible and depends on the specific requirements. The CPU periodically reads the XBUF status registers while accessing XBUF to avoid buffer overflow/underflow. The key to the present invention is the unified Message Queue (a combined data and control message queue) and how it is used during MPEG encoding\decoding. For MPEG encoding and MPEG decoding, the XBUF status registers (see Block 23 of FIGS. 2 and 3) contain the following information:

1) Word count

2) Space count

3) Empty

4) Full

5) Macroblock count.

In Diagram 1 below, we illustrate how the XBUF operates by using MPEG decoding as an example. In this particular example, the CPU (i.e. SW) is responsible for MPEG bit stream parsing and variable-length decoding, and the HW is used to accelerate the rest of the video decoding process, including DQ, IDCT and MC. The data that are passed between the CPU and the HW are the IDCT coefficients of individual macroblocks (MBs). The control information exchanged varies from MB to MB, and contains typically the following items (not a comprehensive list): motion vectors, quantization method, quantization parameters, frame types, rounding control, start-of-slice, macroblock type (inter or intra), etc.

For decoding: these pieces of control information are decoded from the MPEG bitstream by SW and sent to HW for video data decoding. For encoding: these pieces of control information are recognized by the HW MPEG encoder and sent to SW along with associated video data for the SW to perform further encoding.

Diagram 1, shows an example of the message word formats and the tags associated with them, where the tag (TAG0 to TAG5 in this example) denotes if the following information is data or control information.

Diagram 1, XBUF:

| TAG0 | MB ID & TYPE (inter or intra) |
|---|---|
| TAG1 | MPEG Control (Quantization Method, Rounding Control, etc.) |
| TAG2 | Motion Vector |
| TAG3 | Quantization Parameter |
| TAG4 | IDCT Coefficient |
| TAG5 | End of Video |

The operation of the message queue is described as follows:

SW1: The CPU enables the HW.

SW2: The CPU starts decoding the incoming MPEG bit stream, and writes decoded video control/data information into the queue.

SW3: The CPU writes the End of Video message word into the queue.

HW1: The hardware stays in the idle state until enabled by the CPU.

HW2: The hardware checks the content of the message queue, and starts decoding incoming data using the associated MPEG control parameters.

HW3: The hardware reaches the End of Video word, and raises an interrupt signal to notify the CPU that video decoding is finished.

Figure 1:
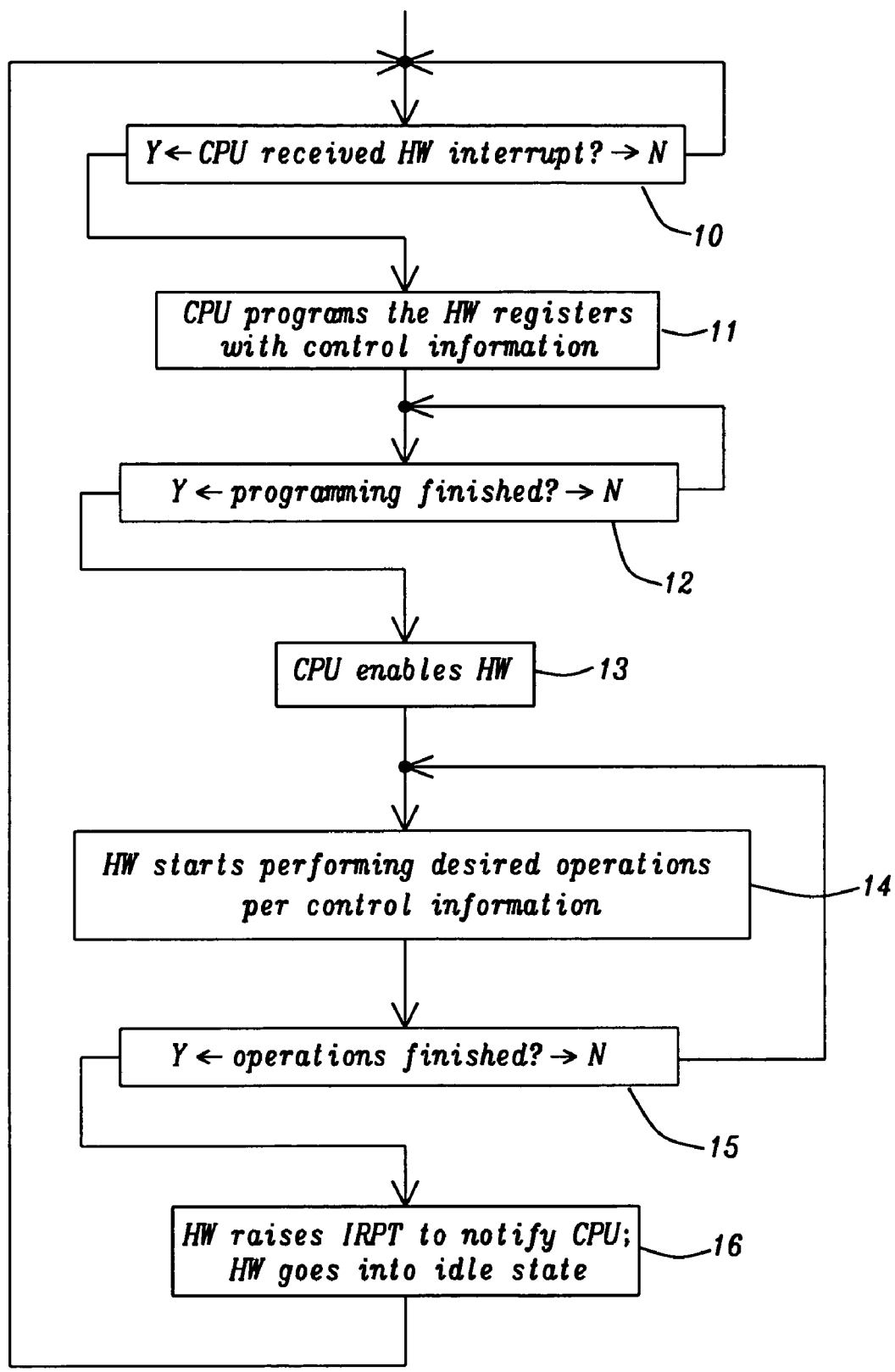
FIG. 1 is a flow chart of the prior art.

It is important to notice the difference between the above straight-forward sequence from SW1 to HW3 and FIG. 1 of the prior art flowchart: in the present invention the CPU enables the hardware at the beginning (SW1) and the hardware signals the CPU at the end. There is no need for the CPU to monitor the hardware to feed it a new set of register values upon the completion of the previous operation. The CPU is therefore available to service other hardware modules, thus saving valuable hardware cycles. At any time, the XBUF content looks like Diagram 2:

Diagram 2:

| TAG0 | MB ID & TYPE (inter or intra) |
|---|---|
| TAG1 | MPEG Control (Quantization Method, Rounding Control, etc.) |
| TAG2 | Motion Vector |
| TAG3 | Quantization Parameter |
| TAG4 | IDCT Coefficient |

. . . .

| TAG4 | IDCT Coefficient |
|---|---|
| TAG0 | MB ID & TYPE (inter or intra) |
| TAG1 | MPEG Control (Quantization Method, Rounding Control, etc.) |
| TAG2 | Motion Vector |
| TAG3 | Quantization Parameter |
| TAG4 | IDCT Coefficient |

. . . .

| TAG5 | End of Video |
|---|---|

Note that TAG4 may be repeated any number of times, and that other set of tags from TAG0 to multiple TAG4's may follow until finally TAG5 End of Video is issued. Again the above sequence is by way of example and in no way limits the scope of the invention.

Without the presence of the XBUF, the CPU will need to synchronize with the HW any time any of the MPEG control parameters changed, forcing the CPU and the HW to operate in the lock-step fashion. With the use of an XBUF, the CPU loads the XBUF and signals the HW. The SW and HW together then process the contents of the XBUF until the end tag (TAG5, by way of example) is reached and an interrupt to the CPU is raised. The CPU in the meantime is free to service other units. The Hardware/Software interface is thus self-synchronizing. The same message word format can be used for MPEG encoding as well, except that the HW is the producer of the messages and the CPU is the consumer.

In the illustrated embodiments, the method of the invention is shown, by way of illustration and not of limitation, as applied either to either the type of message words, the kind of data and control words used or the nature of the interface between the hardware and the software.

Advantages of the present invention are:

MPEG control information can change frequently from one macroblock to the next.

The novelty of the XBUF is that the control information and the data are associated together and queued asynchronously.

The functioning of the data producer and the data consumer (which may operate at very different speeds) can be de-coupled, resulting in more efficient use of computation resources.

Speed differences between software and hardware are compensated for by the depth of the XBUF.

While the invention has been particularly shown and described with reference to the preferred embodiments thereof, it will be understood by those skilled in the art that various changes in form and details may be made without departing from the spirit and scope of the invention.

What is claimed is:

1. A method of providing a self-synchronizing Hardware/Software interface, comprising the steps of:
    a) providing a single combined data and control message queue to interface with both a Software and a Hardware unit, wherein said single combined data and control message queue includes control information and data that are interleaved in a correct order so that said single combined data and control message queue is accessed sequentially without synchronizing between control parameters and data;
    b) enabling said Hardware unit;
    c) performing variable length decoding of an incoming bit stream by said Software and writing decoded control information and data into said combined data and control message queue;
    d) indicating an end of said combined data and control message queue;
    e) checking said combined data and control message queue by said Hardware;
    f) performing video decoding by said Hardware unit of information in said combined data and control message queue using associated control parameters from said combined data and control message queue;
    g) processing said information by said Hardware unit and writing said processed information into said combined data and control message queue for further use by said Software unit; and
    h) raising an interrupt signal by said Hardware that said decoding is finished.

2. The method of claim 1, wherein a data tag identifies a word in said message queue as containing data.

3. The method of claim 1, wherein a control tag identifies a word in said message queue as containing control information.

4. The method of claim 1, wherein different words in said message queue contain different control information and data.

5. The method of claim 1, wherein a speed difference between said Software and said Hardware is compensated by changing the depth of said message queue.

6. The method of claim 1, wherein said Software unit further processes said information written into said message queue by said Hardware unit.

7. A method of providing a self-synchronizing Hardware/Software interface, comprising the steps of:
    a) providing a single combined data and control message queue to interface with both a Software unit and a Hardware unit;
    b) enabling said Hardware unit by said Software unit;
    c) performing variable length decoding of an incoming bit stream by said Software unit and writing decoded control information and data into said combined data and control message queue;
    d) indicating an end of said combined data and control message queue;
    e) checking said combined data and control message queue by said Hardware unit;
    f) performing video decoding by said Hardware unit of information in said combined data and control message queue using associated control parameters from said combined data and control message queue;
    g) processing said information by said Hardware unit and writing said processed information into said combined data and control message queue for further use by said Software unit; and
    h) after steps a through g, raising an interrupt signal by said Hardware unit to said Software unit that said decoding is finished, wherein said Software unit does not monitor said Hardware unit during steps c through g.

8. The method of claim 7, wherein a data tag identifies a word in said message queue as containing data.

9. The method of claim 7, wherein a control tag identifies a word in said message queue as containing control information.

10. The method of claim 7, wherein different words in said message queue contain different control information and data.

11. The method of claim 7, wherein a speed difference between said Software unit and said Hardware unit is compensated by changing the depth of said message queue.

12. The method of claim 7, wherein said Software unit further processes said information written into said message queue by said Hardware unit.

13. The method of claim 7, wherein said control information and said data are interleaved in said message queue in a correct order so that said message queue can be accessed sequentially.

* * * * *